US010363854B2

(12) United States Patent
Lamb et al.

(10) Patent No.: US 10,363,854 B2
(45) Date of Patent: Jul. 30, 2019

(54) PORTABLE ELECTRONIC DEVICE POSITIONING APPARATUS

(71) Applicant: Astronics Advanced Electronic Systems Corp., Kirkland, WA (US)

(72) Inventors: John S. Lamb, Bothell, WA (US); Dennis P. Markert, Federal Way, WA (US)

(73) Assignee: Astronics Advanced Electronic Systems Corp., Kirkland, WA (US)

( * ) Notice: Subject to any disclaimer, the term of this patent is extended or adjusted under 35 U.S.C. 154(b) by 0 days.

(21) Appl. No.: 15/997,083

(22) Filed: Jun. 4, 2018

(65) Prior Publication Data
US 2018/0354398 A1    Dec. 13, 2018

Related U.S. Application Data

(60) Provisional application No. 62/517,113, filed on Jun. 8, 2017.

(51) Int. Cl.
*B60N 3/00* (2006.01)
*F16M 11/08* (2006.01)
*A47C 7/70* (2006.01)
*G06F 1/16* (2006.01)

(52) U.S. Cl.
CPC ............... *B60N 3/004* (2013.01); *A47C 7/70* (2013.01); *F16M 11/08* (2013.01); *G06F 1/1632* (2013.01)

(58) Field of Classification Search
CPC ........ B60N 3/004; F16M 11/10; F16M 11/12; A47C 7/70; G06F 1/1632
See application file for complete search history.

(56) References Cited

U.S. PATENT DOCUMENTS

| 7,506,923 B1 | 3/2009 | Gauss |
| D701,213 S | 3/2014 | Pajic |
| 8,667,904 B2 * | 3/2014 | Pajic ............... A47B 23/00 108/44 |
| 8,826,830 B2 | 9/2014 | Pajic |
| 9,067,682 B2 | 6/2015 | Pajic |
| 9,167,905 B2 | 10/2015 | Pajic |
| 9,168,876 B2 | 10/2015 | Pajic |

(Continued)

FOREIGN PATENT DOCUMENTS

| DE | 102006016700 B3 * | 6/2007 | ............. B60N 3/004 |
| FR | 2982218 A1 * | 5/2013 | ............. B60N 3/004 |

OTHER PUBLICATIONS

English translation of DE 10 2006 016 700 B3 from espacenet.com (Year: 2019).*

(Continued)

*Primary Examiner* — Daniel J Rohrhoff
(74) *Attorney, Agent, or Firm* — Wiggin and Dana LLP; Gregory S. Rosenblatt; Jonathan D. Hall (57) ABSTRACT

Disclosed is a Personal Electronic Device (PED) positioning apparatus that stows within a tray table. An articulated holder includes a crossbar arm that slides on at least one support shaft to a position where a crossbar can be rotate to provide an angled surface relative to the tray table to support a PED. When stowed, the crossbar presents a minimal profile with respect to the tray table. The exposed surface of the crossbar can be made to match the color and appearance of the tray table so that the apparatus has minimal visual impact.

20 Claims, 12 Drawing Sheets

(56) References Cited

U.S. PATENT DOCUMENTS

| | | | |
|---|---|---|---|
| 9,242,733 B2 | 1/2016 | Pajic | |
| 9,403,596 B2 | 8/2016 | Pajic | |
| 9,409,647 B2 | 8/2016 | Pajic | |
| 9,481,465 B2 | 11/2016 | Pajic | |
| 9,623,971 B2 | 4/2017 | Pajic | |
| 9,701,234 B2 | 6/2017 | Pajic | |
| 9,751,630 B1* | 9/2017 | Melton | B64D 11/0638 |
| 10,273,009 B2* | 4/2019 | Fishel | A47B 23/001 |
| 2002/0003361 A1 | 1/2002 | Duerr et al. | |
| 2004/0075308 A1 | 4/2004 | Cutshall et al. | |
| 2011/0126739 A1 | 6/2011 | Korpi | |
| 2013/0070171 A1* | 3/2013 | Boyer, Jr. | H04N 5/655 |
| | | | 348/837 |
| 2013/0264298 A1* | 10/2013 | Shih | B64D 11/06 |
| | | | 211/26 |
| 2016/0039525 A1* | 2/2016 | Pajic | B64D 11/0638 |
| | | | 108/44 |
| 2016/0113388 A1* | 4/2016 | Distefano | A47B 5/04 |
| | | | 108/41 |
| 2017/0021931 A1* | 1/2017 | Stephens | B64D 11/0638 |
| 2017/0135468 A1* | 5/2017 | Johnson | A47B 23/02 |
| 2017/0166141 A1* | 6/2017 | Pajic | B60R 11/0252 |

OTHER PUBLICATIONS

International Search Report and Written Opinion in related application PCT/US2018/036027, dated Jul. 26, 2018, 6 pages.

\* cited by examiner

PORTABLE ELECTRONIC DEVICE POSITIONING APPARATUS

CROSS-REFERENCE TO RELATED APPLICATION

This application claims the benefit of U.S. Provisional Patent Application No. 62/517,113 entitled "Hidden Holder for Portable Electronic Devices" and filed Jun. 8, 2017. The contents of U.S. Provisional Patent Application No. 62/517, 113 are hereby incorporated herein in their entirety.

FIELD OF THE DISCLOSURE

The subject matter of the present disclosure relates to the retention and presentation of Personal Electronic Devices (PEDs).

BACKGROUND

Individuals increasingly rely on their PEDs as a resource for entertainment, business and general computing access. This is true even in aircraft passenger cabins, where passengers previously relied partly or solely on in-flight entertainment units located in seatbacks. Increased internet access and PED quality have made PEDs viable devices even in long flights. Simultaneously, there is a desire on the part of aircraft operators to reduce the weight, complexity and cost associated with in-flight entertainment units, particularly when such units are under-utilized.

Current solutions for holding Portable Electronic Devices (PEDs) occupy some of the usable surface of the tray tables in aircraft and other passenger vessels. Additionally, current solutions include gaps and crevices around the PED holders that allow spilled food and liquids to accumulate, resulting in a potential health/cleanliness concerns. Current solutions also include multiple components that are visible. In practice, it requires additional effort to control the appearance of those multiple components, presenting color and texture matching concerns.

BRIEF DESCRIPTION

Disclosed is a tray table PED positioning apparatus. In a stowed position, the apparatus presents minimal visible surface area or gaps, thereby greatly reducing the cleaning and appearance matching problems found with current solutions. In a deployed position, the apparatus supports and orients a PED for viewing and use while occupying a minimal surface of the tray table.

DETAILED DESCRIPTION

Figure 1:
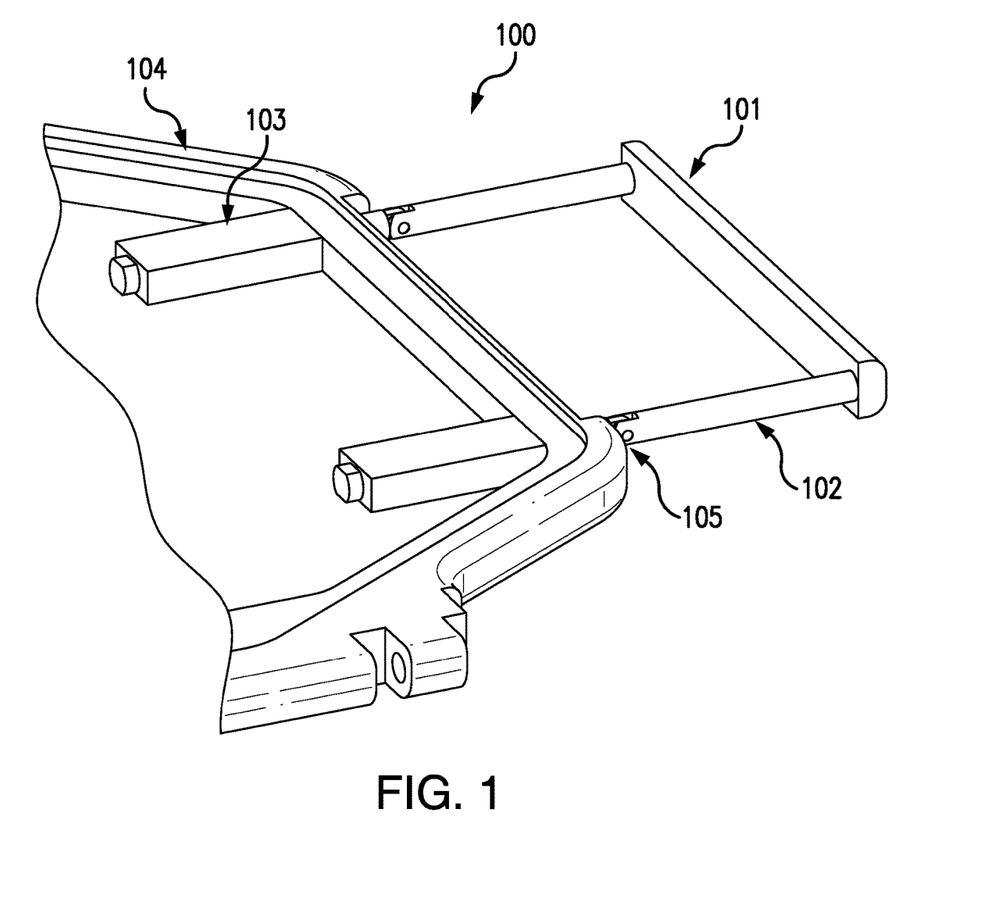
FIG. 1 depicts the components of a first embodiment apparatus.

Disclosed is a PED positioning apparatus. With reference to FIG. 1, in a first embodiment, the PED positioning apparatus 100 includes a crossbar 101 affixed to crossbar arms 102. Alternatively, there may be one, or three or greater crossbar arms. In FIGS. 1 and 2, the top surface of the tray table is not depicted to show internal structure. The crossbar arms 102 are configured to be stowed inside guide shafts 103 internal to a tray table 104. The crossbar arms 102 each have hinges 105 in proximity to the guide shafts 103. When in a stowed position, the crossbar arms 102 are disposed within the guide shafts 103 of the tray table, and thus not visible to the user, while the crossbar 101 rests as an edge to the tray table, presenting a minimal profile. To deploy, the crossbar 101 is pulled out, extending the crossbar arms 102 outside of the guide shafts 103. The crossbar arms 102 are then rotated at the hinges 105 so as to be at an angle with respect to the surface of the tray table 104 such that a PED may be disposed on the tray table and positioned for viewing at an appropriate angle.

Figure 2A:
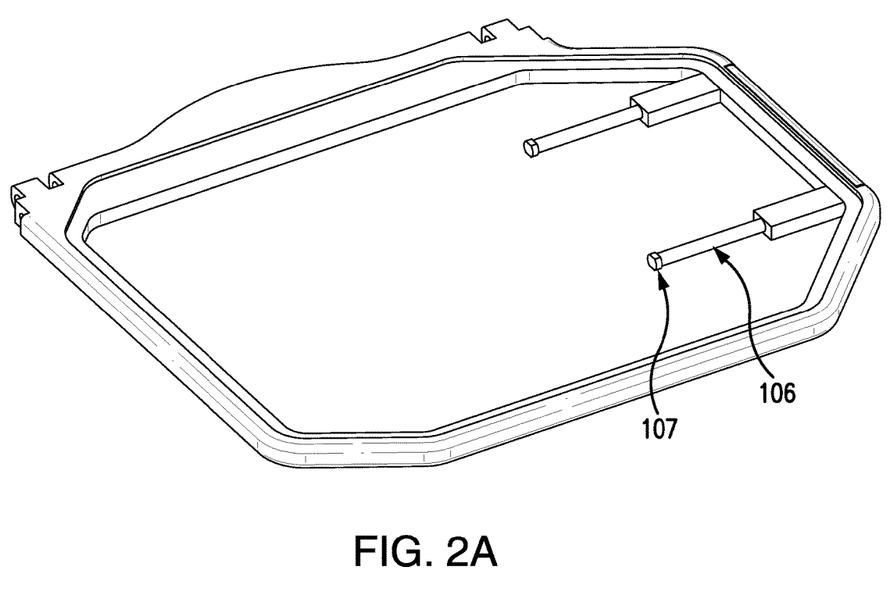
FIG. 2A depicts the apparatus of FIG. 1 in a stowed position as a portion of a bi-fold aircraft tray table.

With reference to FIG. 2A, each crossbar arm is attached to an inner arm 106 via the hinge 105. The inner arms 106 are disposed within the tray table when in a stowed position as shown in FIG. 2. When extended, the inner arms are disposed within guide shafts 103. Slide stops 107 prevent inner arms 106 from extending outward beyond an internal surface of guide shafts 103. In alternate embodiments, the crossbar arms 102 may be telescopic with multiple concentric members.

Figure 2B:
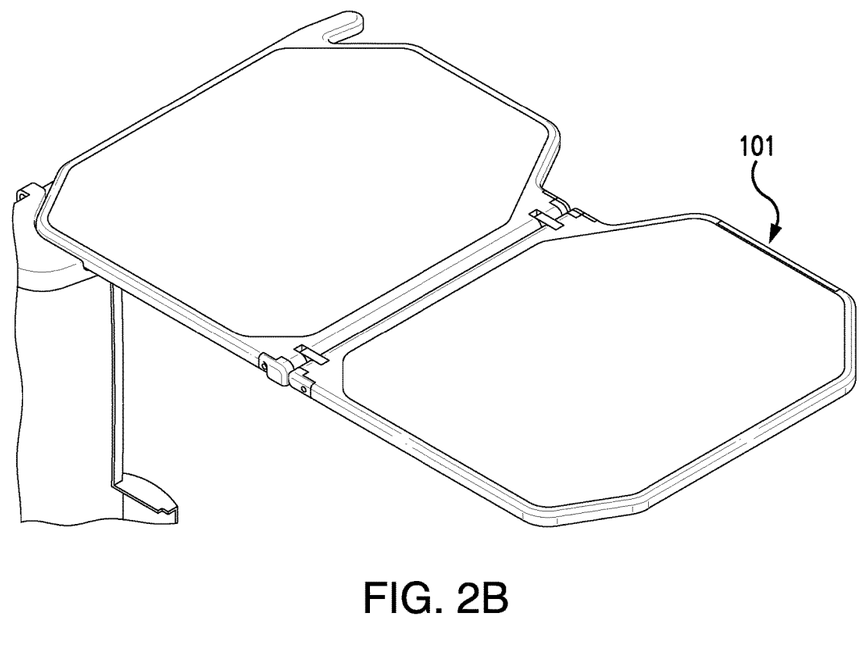
FIG. 2B depicts the apparatus of FIG. 2A in a stowed position when the bi-fold aircraft tray table is fully unfolded.

FIG. 2B depicts the first embodiment PED positioning apparatus 100 in a stowed position in a bi-fold aircraft tray. Optionally, the exposed surface of the PED positioning apparatus 100 can be made to match the shape, size, and appearance of the tray table with minimal gaps. The outward surface of the crossbar 101 may alternatively rest within the tray table, with a pull tab or other mechanism being provided to expel or begin expelling the crossbar from a stowed position.

Figure 2C:
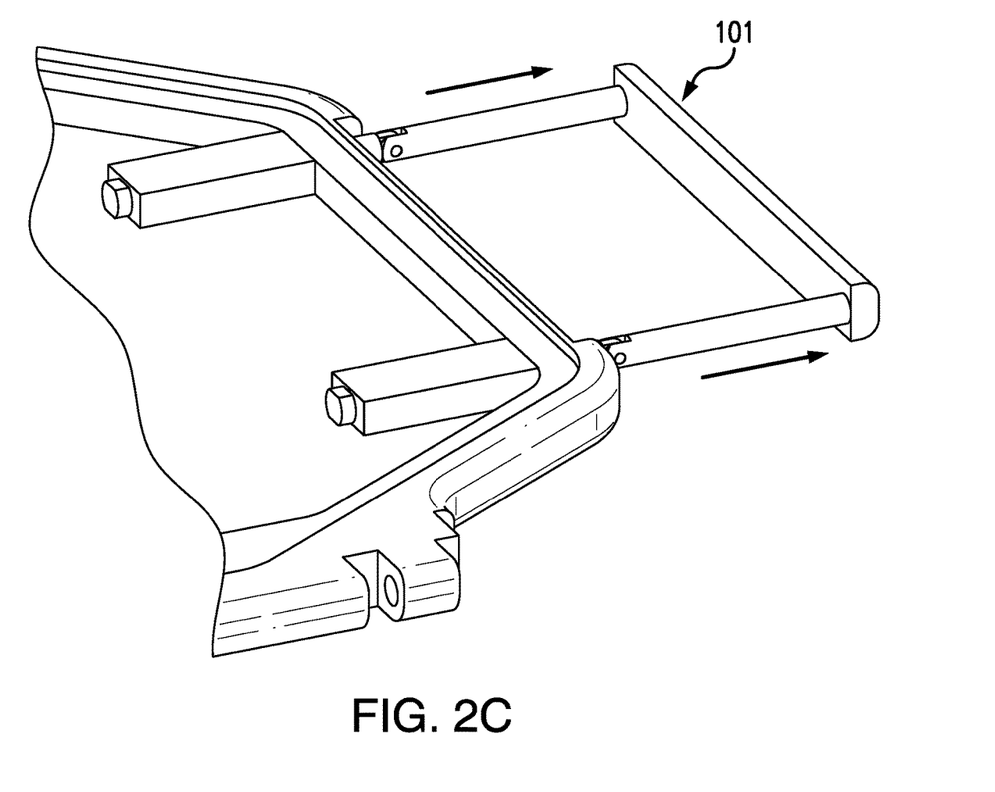
FIG. 2C depicts the apparatus of FIG. 2A in which the cross bar has been extended outward from the tray table.

FIG. 2C depicts the PED positioning apparatus 100 as it is extended out during the setup process.

Figure 2D:
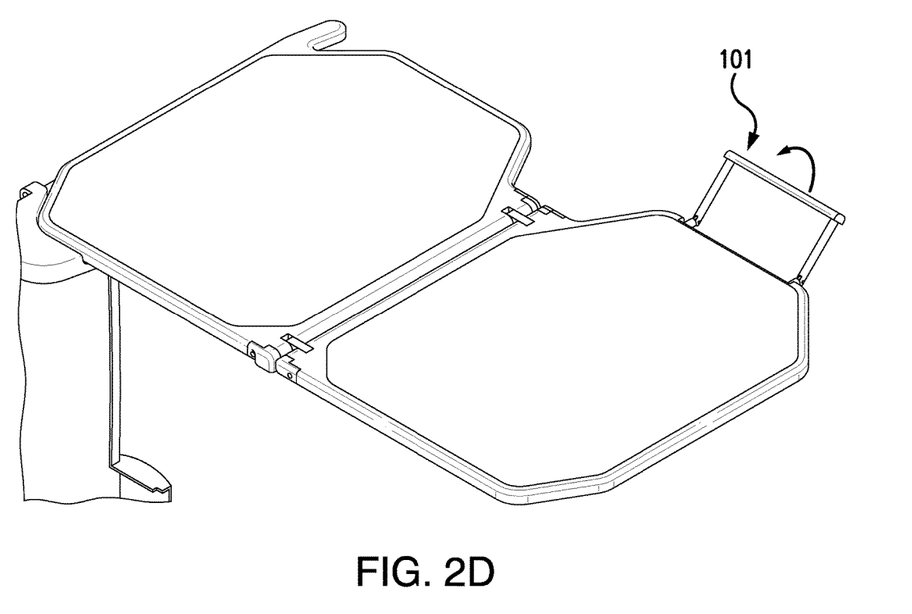
FIG. 2D depicts the apparatus of FIG. 2A in a deployed position in which the cross bar has been rotated upwards.

FIG. 2D depicts the PED positioning apparatus 100 in a deployed position, wherein the crossbar 101 has been rotated upwards so that the crossbar arms 102 are at an angle with respect to the surface of the tray table. In the embodiment, the hinges 105 of the crossbar arms have a single axis of rotation. The desired angle may be selectable by the user or may be preset.

Figure 2E:
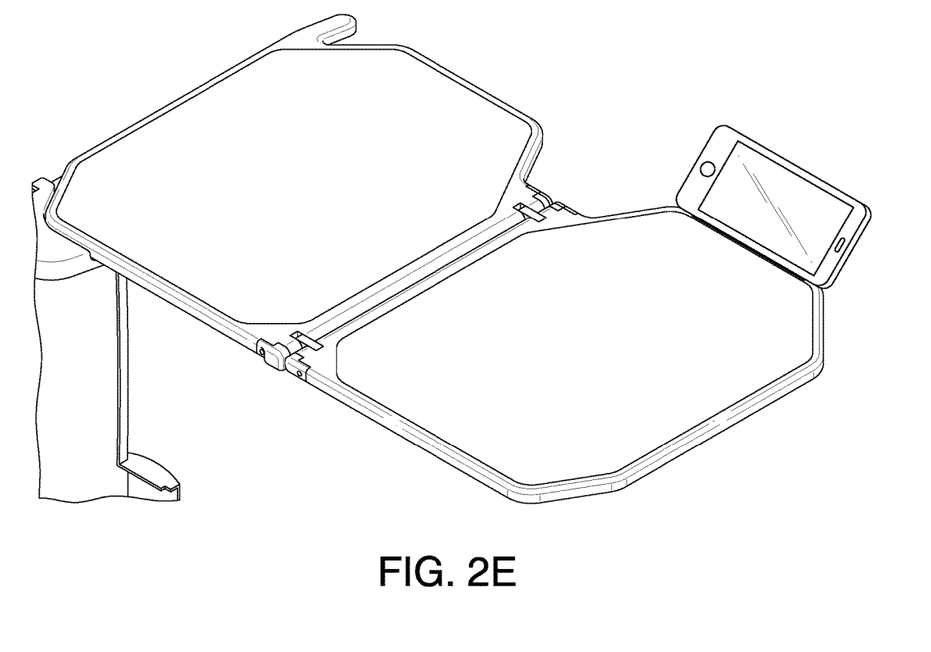
FIG. 2E depicts the apparatus of FIG. 2A supporting a PED.

FIG. 2E depicts the PED positioning apparatus 100 with a PED disposed against the crossbar 101. The occupied tray table space for the PED holder and PED is minimal.

Figure 2F:
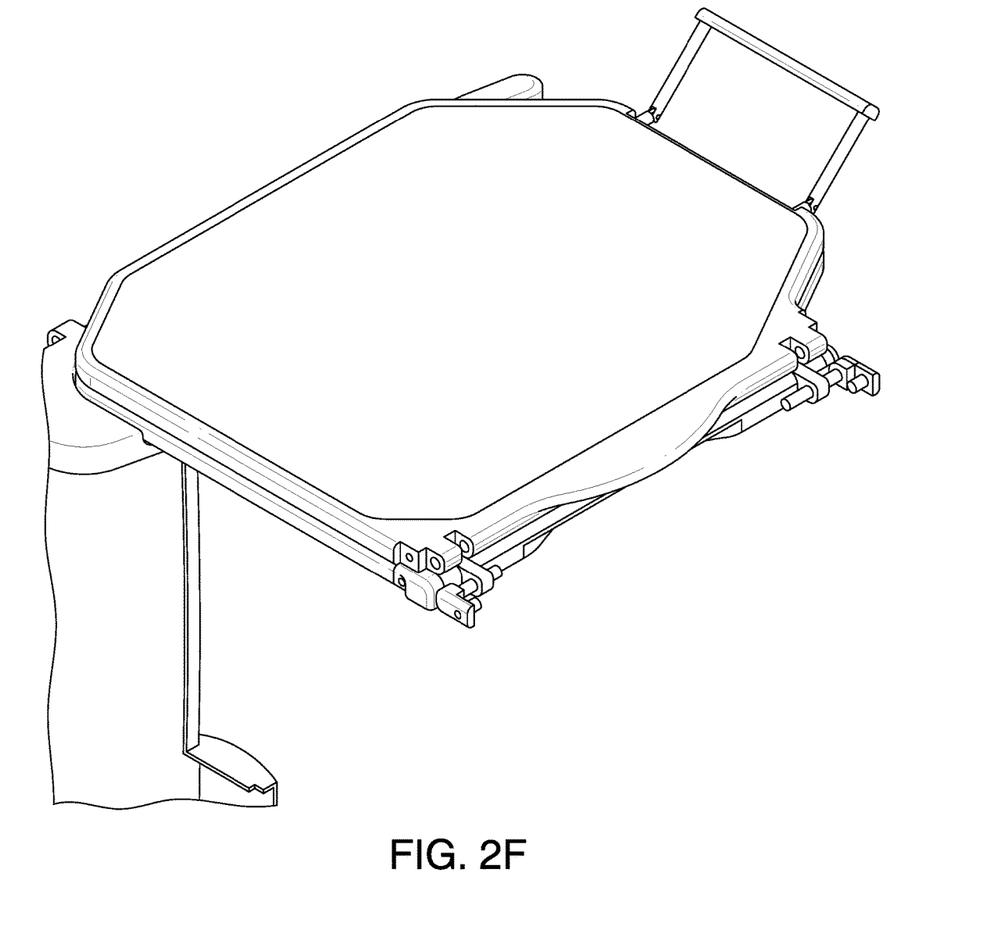
FIG. 2F depicts the apparatus of FIG. 2A in a deployed position when the bi-fold tray table is in a half-open state.

FIG. 2F depicts the bi-fold aircraft tray table in a half-folded position, with the crossbar 101 rotated in an opposite direction from the deployed position for FIG. 2E. Therefore, the PED positioning apparatus functions in either direction, so that the user can support a PED with the tray table half folded or fully deployed. In certain embodiments, the PED positioning apparatus may be installed in either, or both leafs of the tray table.

Figure 3:
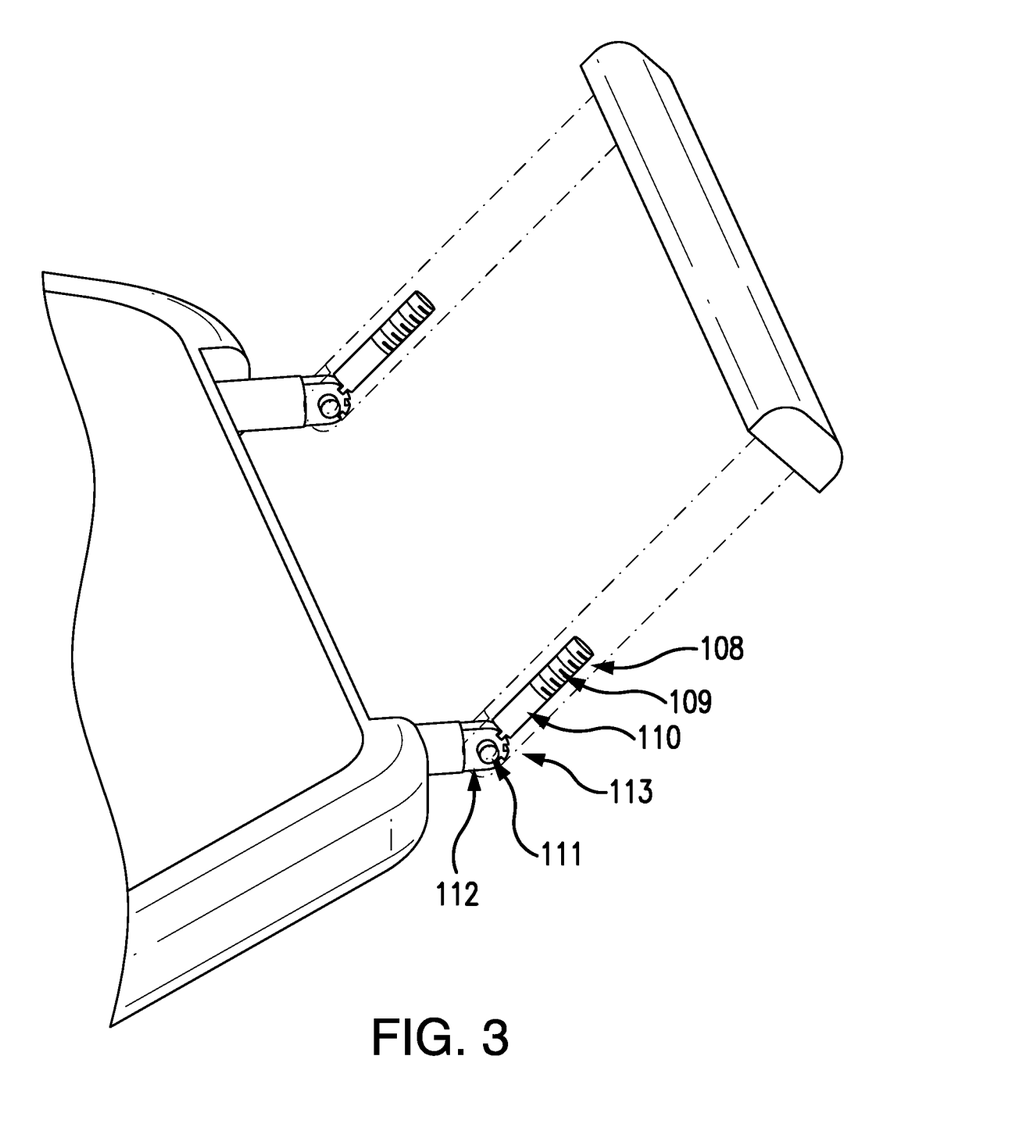
FIG. 3 depicts an embodiment locking mechanism.

FIG. 3 depicts an internal view of the hinge and locking system for the first embodiment. Particularly, there is an internal cavity 108 in which there is a spring 109 and detent pin 110. The crossbar arms are configured to rotate about pins 111. Spring 109 maintains pressure against the detent pin 110, thereby maintaining contact between the detent pin 110 and the hinge joint 112. The hinge joint has a series of detents 113 on its surface with which the rounded, preferably hemispherical, surface of the detent pin is configured to interface. In the embodiment, the detents have rounded corners, thereby allowing detent pin to rotate around the hinge joint 112 with sufficient pressure, but allowing the retention of the detent pin in a particular detent with minimal or no rotational pressure.

Figure 4A:
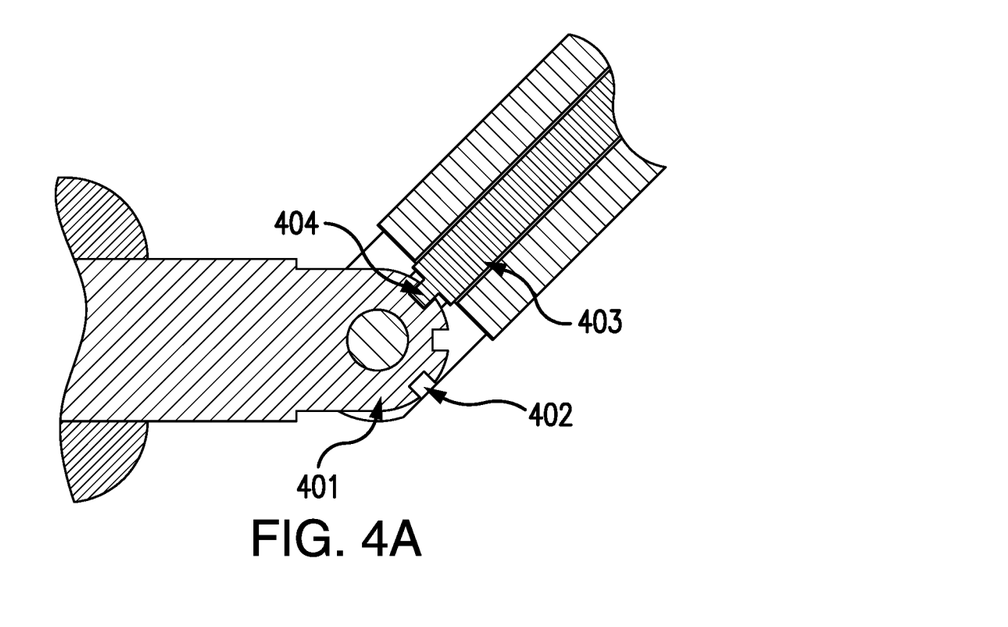
FIG. 4A depicts a side plan view of an embodiment joint in a locked position.
Figure 4B:
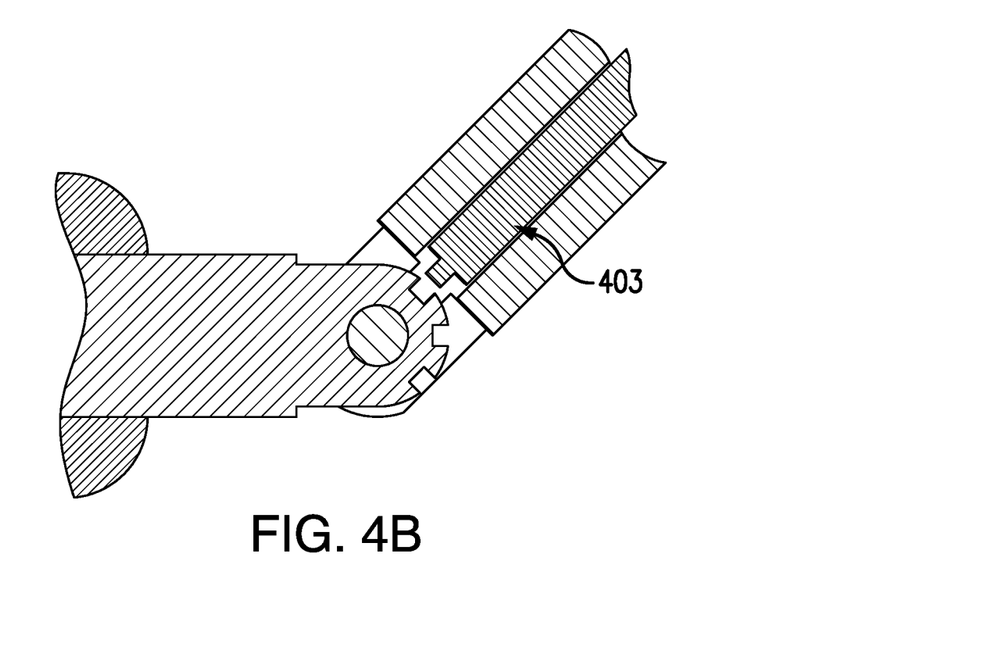
FIG. 4B depicts a side plan view of the embodiment joint of FIG. 4A in a unlocked position.

FIG. 4A depicts another hinge design. Hinge joint 401 has disposed on its exterior a series of notches 402. Detent pin 403 has a locking tip 404 that locks into one of the notches 402 when in a locked configuration. FIG. 4B depicts the hinge design of FIG. 4A, wherein the locking tip 404 is disengaged. The user disengages the locking tip 404 by pulling outward on the crossbar.

Figure 6:
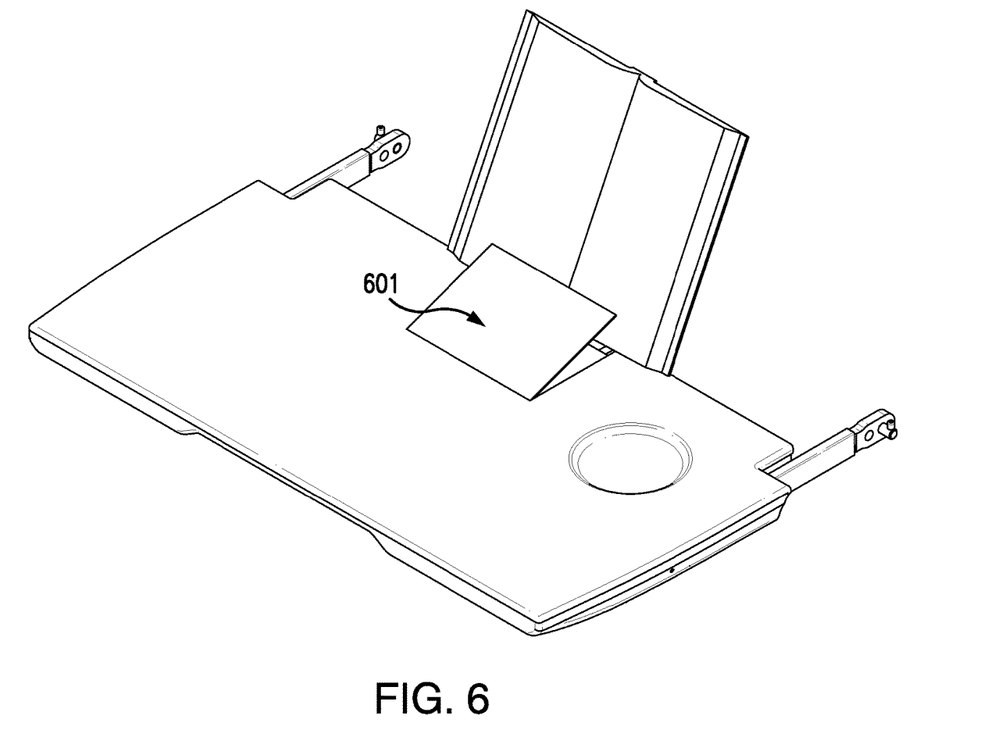
FIG. 6 depicts a third embodiment having a book page prop.

In certain embodiments, the PED positioning apparatus may be configured so that it can alternatively hold a book in an open position. With reference to FIG. 6, appendage 601 is configured to secure the book in such an open position. Alternatively, a bail wire may be employed.

In certain embodiments, hinges employed with crossbar arms can provide continuous resistance to rotation so that position of the crossbar can be set at multiple angles using, for example, a friction hinge. An additional lock for the desired angle may be employed. Alternatively, employed hinges may provide incremental resistance so that rotational position of the crossbar can stop at pre-defined angles and provide support to the PED using, for example, detent positions. Friction washers may be employed at the hinges to supply desired friction.

Optionally, the crossbar can be of a material that provides a non-slip surface to prevent the PED from moving and to provide a non-marring surface, for instance by being made from rubber or a rubber substitute.

The crossbar may provide a feature allowing the user to easily grip the crossbar in order to move it from a stowed to an extended position. The feature could be a protrusion such as one or more raised ribs or a depressed feature such as one or more grooves.

Figure 5A:
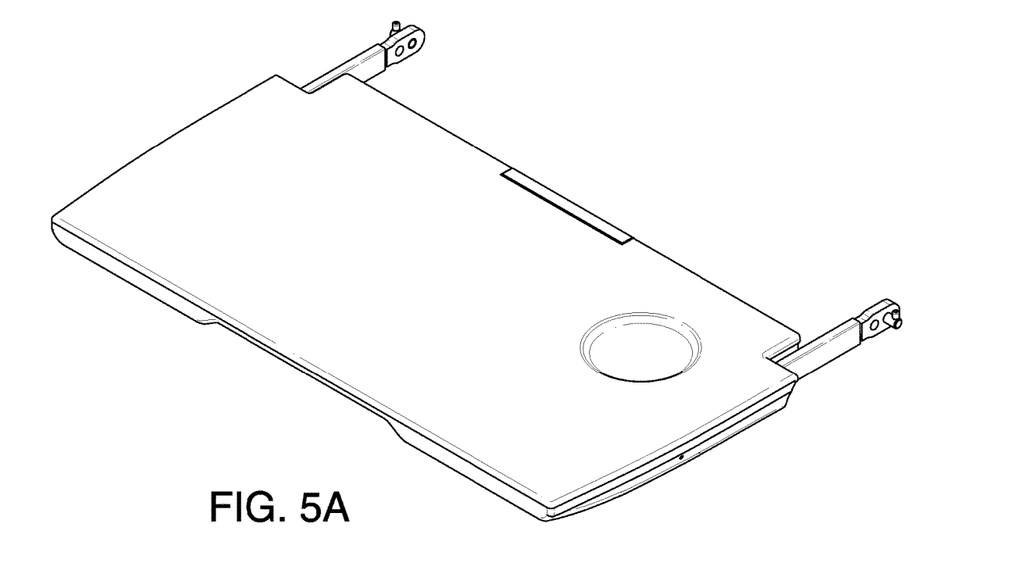
FIG. 5A depicts a second embodiment apparatus disposed in a seat-back tray table.
Figure 5B:
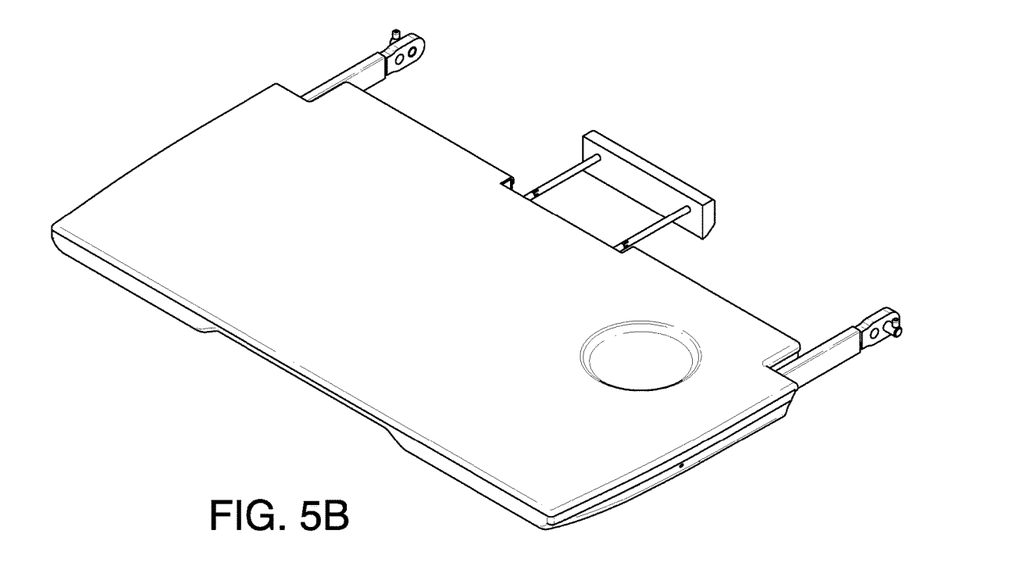
FIG. 5B depicts the second embodiment apparatus of FIG. 5A wherein the crossbar is extended.
Figure 5C:
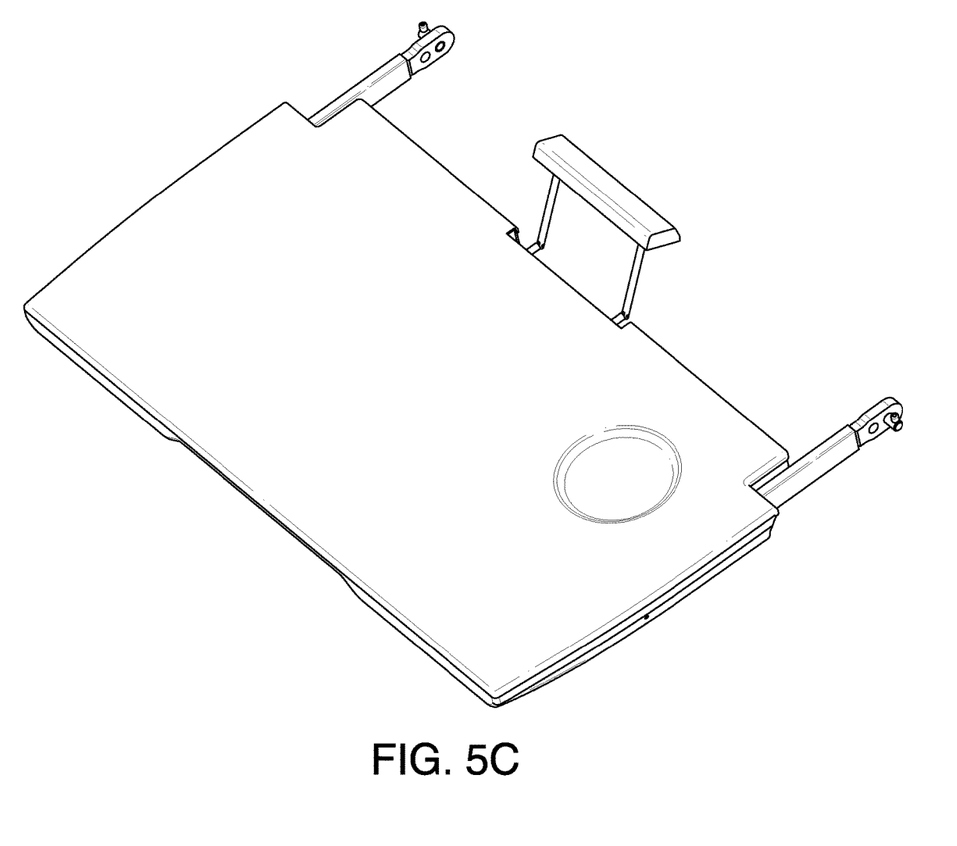
FIG. 5C depicts the second embodiment apparatus of FIG. 5A wherein the crossbar is deployed.

The disclosed subject matter may be used in seatback mounted tray tables, as depicted in FIGS. 5A-C, or in other work surfaces.

What is claimed:

1. A Personal Electronic Device (PED) positioning apparatus, comprising:
   at least one guide shaft disposed internally in a tray table;
   a crossbar;
   at least one crossbar arm connected to the crossbar at a first position and attached to an inner arm by a hinge at an opposing second position, wherein the crossbar arm, the hinge and the inner arm are all configured to fit within the guide shaft;
   wherein the crossbar arm is configured to be stowable within the guide shaft when in a stowed position;
   wherein the crossbar arm is configured to extend from the guide shaft and beyond the tray table in a deployed configuration, wherein the crossbar atm is further configured to rotate at the hinge so as to dispose the crossbar at an angle with respect to a surface of the tray table that is effective to retain the PED in a viewing position.

2. The PED positioning apparatus of claim 1 wherein the crossbar forms a portion of an edge of the tray table when in a stowed position.

3. The PED positioning apparatus of claim 1 wherein the crossbar is flush with an edge of the tray table when in a stowed position.

4. The PED positioning apparatus of claim 1 wherein the tray table is disposed in a passenger aircraft.

5. The PED positioning apparatus of claim 4 wherein the tray table is a seat back tray table.

6. The PED positioning apparatus of claim 4 wherein the tray table is a bi-fold tray table.

7. The PED positioning apparatus of claim 6 wherein the hinge is configured to allow the crossbar arm to position the crossbar at an angle with respect to the surface of the tray table that is effective to retain a PED in a viewing position when either the bi-fold tray table is in a fully deployed configuration or a half deployed configuration.

8. The PED positioning apparatus of claim 1 wherein a portion of the crossbar that is exposed when in a stowed position has a color matching a color of the tray table.

9. The PED positioning apparatus of claim 1 wherein the hinge is a friction hinge providing a continuous resistance to rotation allowing the crossbar to be configured at a range of angles.

10. The PED positioning apparatus of claim 1 wherein the hinge has a plurality of detents allowing the crossbar to be configured at a set of pre-defined angles.

11. A Personal Electronic Device (PED) positioning apparatus, comprising:
    a tray table having formed therein a first and second guide shaft;
    a first and second crossbar arm each having a first end attached to a crossbar and an opposing second end attached to an inner arm by a hinge;
    wherein each of the first and second crossbar arms, the hinges and the inner arms are configured to fit within one of the first and second guide shafts;
    wherein in a stowed position, the crossbar arms are configured to be stowed within the respective associated guide shaft;
    wherein in a deployed position, the first and second crossbar arms are configured to extend from the first and second guides shafts beyond the tray table to position the crossbar so that it may support a PED disposed so a display of the PED is at a viewing angle relative to a surface of the tray table.

12. The PED positioning apparatus of claim 11 wherein the crossbar forms a portion of an edge of the tray table when in a stowed position.

13. The PED positioning apparatus of claim 11 wherein the crossbar is flush with an edge of the tray table when in a stowed position.

14. The PED positioning apparatus of claim 11 wherein the tray table is a seat back tray table.

15. The PED positioning apparatus of claim 11 wherein the tray table is a bi-fold tray table.

16. The PED positioning apparatus of claim 11 wherein the hinge is a friction hinge providing a continuous resistance to rotation allowing the crossbar to be configured at a range of angles.

17. The PED positioning apparatus of claim 11 wherein the hinge has a plurality of detents allowing the crossbar to be configured at a set of pre-defined angles.

18. A method of positioning a PED, comprising the steps of:

providing a tray table having at least one guide shaft disposed internally;

providing at least one crossbar arm having a first end attached to an inner arm by a hinge and a second end interconnected with a crossbar;

wherein in an initial state the crossbar arm is disposed within the guide shaft and the crossbar sits against the edge of the tray table;

extending the crossbar arm outward from the guide shaft and beyond the tray table to an extended position wherein the inner arm is disposed within the guide shaft;

rotating the crossbar arm via the hinge so that the crossbar arm is disposed at an angle from a surface of the tray table; and placing a PED against the crossbar such that a display of the PED is presented at a viewing angle.

19. The method of claim 18 wherein the hinge is a friction hinge providing a continuous resistance to rotation allowing the crossbar to be configured at a continuation range of angles.

20. The method of claim 18 wherein the hinge has a plurality of detents allowing the crossbar to be configured at pre-defined angles.

* * * * *